3,497,480
PROCESS FOR MAKING COPOLYMERIZATES OF VINYL CHLORIDE WHICH YIELD CLEAR SOLUTIONS IN LACQUER SOLVENTS
Johann Bauer, Burghausen, Upper Bavaria, Hans-Walter Ebersbach, Grafing-Bahnhoff, Upper Bavaria, and Kurt Fendel and Joseph Heckmaier, Burghausen, Upper Bavaria, Germany, assignors to Wacker-Chemie G.m.b.H., Munich, Bavaria, Germany, a corporation of Germany
No Drawing. Filed May 10, 1967, Ser. No. 637,328
Claims priority, application Germany, May 17, 1966, W 41,599
Int. Cl. C08f 1/11; C09d 3/74
U.S. Cl. 260—78.5      4 Claims

ABSTRACT OF THE DISCLOSURE

This invention relates to manufacturing copolymerizates of vinyl chloride which yield clear solutions in lacquer solvents, and it has for its object to provide a novel and improved process for this purpose.

In particular, it concerns the use of protective colloids in the manufacture of thermoplastic substances which are to be dissolved in lacquer solvents, and which are manufactured by the suspension polymerization of mixtures of vinyl chloride and other olefinically unsaturated compounds which can be copolymerized therewith.

Background of the invention

Suspension polymerization of thermoplastic materials intended to be dissolved in lacquer solvents, sometimes called "pearl polymerization," has been known for some time. It involves the copolymerization of vinyl chloride and other monomers that can be copolymerized therewith, in aqueous dispersion in the presence of protective colloids while using monomer soluble catalysts for polymerizate suspensions which quickly separate after the mixing necessary for maintaining the dispersion during polymerization ceases.

The protective colloids generally cling very firmly to the surface of the polymerizate particles and cannot be completely removed even by thorough rinsing of the polymerizates with water. This fact, together with the fact that the protective colloids which are most frequently used are not soluble in the lacquer solvents customarily used, leads to clouding or the formation of flakes in the solutions of the polymerizates in the lacquer solvents.

These undesirable occurrences take place even when one uses water-soluble salts of binary copolymerizates of maleic acid anhydride and vinyl acetate, styrol or vinyl ethers for protective colloids. These protective colloids have the further drawback that their use within the quantity range most frequently used for protective colloids, namely 0.1 to 0.3 weight percent referred to the weight of the monomers, yields very coarse-grained products. Polymerizates of satisfactory grain size are obtained only from considerably higher concentrations of these known protective colloids. However, the use of protective colloid quantities which considerably exceed 0.3 weight percent, referred to the weight of the monomers, besides the drawback of greater consumption of chemicals, has the further drawback that the chances for washing out the protective colloids from the polymerizates are made more difficult, which impairs many properties of the polymerizates, e.g. their electrical characteristics.

It is true that cloudiness or flaking caused by the insolubility of protective colloids in lacquer solvents can be eliminated by chemical transformations, to be made after polymerization, where the protective colloids are transformed into compounds which are easily soluble in lacquer solvents. However, the expense of such transformations is a great detriment.

Summary of the invention

By the process of our invention, fine-grained polymerizates are obtained which after the usual rinsing with water without additional chemical transformations yield clear solutions in lacquer solvents.

Our process for making copolymerizates which yield clear solutions in lacquer solvents, by the suspension polymerization of mixtures of vinyl chloride and other olefinically unsaturated compounds that can be copolymerized therewith, in aqueous dispersion in the presence of copolymerizates of maleic acid anhydride as protective colloid, using monomer soluble catalysts, is characterized by the fact that we use for protective colloids water-soluble salts of mixed polymerizates of (1) maleic acid anhydride, (2) compounds of the general formula $$CH_2=CH-X-C_nH_{2n+1}$$

where X is an ether oxygen atom or a residue of the formula

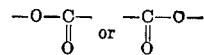

and $n$ is a positive whole number with a value of at least 4, and (3) compounds of the general formula $$CH_2=CHR$$

where R is the phenyl residue or a residue of the general formula $-OC_mH_{2m+1}$ or

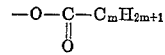

($m$ is 1, 2 or 3, respectively).

Description of the preferred embodiments

In accordance with our invention, one can use all mixtures of vinyl chloride and other olefinically unsaturated compounds that can be copolymerized with it, which are suitable for making copolymerizates of vinyl chloride that are soluble in lacquer solvents. Many such mixtures are known. Examples of monomers containing such mixtures besides vinyl chloride are vinylidene chloride, vinyl esters of aliphatic and cycloaliphatic monocarboxylic acids, particularly vinyl acetate, acrylic acid, alkyl esters of olefinically unsaturated monocarboxylic acids like acrylic acid esters, e.g. methyl acrylate, acryl nitrile, maleic acid and maleic acid anhydride, mono- and dialkyl esters of olefinically unsaturated dicarboxylic acid like maleic acid monomethyl ester and maleic acid dimethyl ester, and vinyl ethers, like vinyl isobutyl ether. The mixture of vinyl chloride and other olefinically unsaturated compounds that can be copolymerized with it may contain more than one other olefinically unsaturated compound that can be copolymerized with vinyl chloride. Preferred for another olefinically unsaturated compound that can be copolymerized with vinyl chloride is vinyl acetate perhaps in a mixture with 5 to 15 weight percent, referred to the vinyl acetate weight, of maleic acid. Preferably the mixtures of vinyl chloride and the other olefinically unsaturated compounds copolymerizable with it contain 50 to 95 weight percent, especially 6 to 85 weight percent, each time referred to the total weight of monomers, of vinyl chloride.

All monomer soluble polymerization catalysts that can be used for the suspension polymerization of vinyl chloride can also be used for the process of our invention. Here are some examples of such catalysts: diacyl peroxides like diacetyl, didecanoyl, acetylbenzoyl, dilauroyl, dibenzoyl and bis-2,4-dichlorobenzoyl peroxide, dialkyl peroxides like di-tert.-butyl peroxide, percarbonates like diisopropylperoxy-di-carbonate, percarboxylic acid esters like tert.-butylperpivalate, mixed anhydrides or organic sulfoperacids with organic acids like acetyl cyclohexanesulfonyl peroxide as well as azo compounds known as polymerization catalysts like azobutyric acid dinitrile. Mixtures of such catalysts can be used. If necessary, in addition to the monomer soluble catalysts one can use water soluble catalysts like hydrogen peroxide and potassium persulfate. The catalysts can be used in quantities customary for the suspension polymerization of vinyl chloride. Generally these quantities amount to 0.00005 to 3 weight percent, mostly 0.001 to 0.3 weight percent, each time referred to the total weight of the monomers to be polymerized.

The quantitative proportion between water and the monomers to be polymerized is not critical. Generally the percentage of the monomers to be polymerized amounts to 10 to 60%, particularly 20 to 40% of the total weight of water and monomers.

The copolymers whose water-soluble salts in accordance with the invention are used as protective colloids consist preferably of 30 to 60 mol percent, particularly 45 to 55 mol percent of (1) maleic acid units, particularly maleic acid anhydride units, 1 to 25 mol percent, particularly 5 to 15 mol percent, (2) polymer units which are derived from the general formula

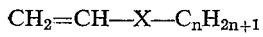
$$CH_2=CH—X—C_nH_{2n+1}$$

where X and $n$ have the meaning indicated above, and 100–A, where A represents the sum of the mol percent of units (1) and (2) contained in the copolymerizates, mol percent (3) polymer units which are derived from compounds of the general formula $CH_2=CHR$, where R has the meaning indicated above. Preferably the number of mol percent of units (2) is never greater than that of mol percent of units (3).

The remainders $C_nH_{2n+1}$ and $C_mH_{2m+1}$ can be either straight-chained or branched. Preferably the value of $n$ is not higher than 28.

The compounds (2) of the general formula

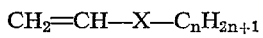
$$CH_2=CH—X—C_nH_{2n+1}$$

can be vinyl ethers like vinyl n-butyl ether, vinyl isobutyl ether, vinyl-2-ethylhexylether and vinyl-n-dodecyl ether, acrylic acid esters like n-butyl acrylate, isobutyl acrylate, 2-ethylhexyl acrylate and n-dodecyl acrylate, or vinyl esters. Preferred as compounds (2) are vinyl esters of saturated aliphatic monocarboxylic acids with at least 5 carbon atoms, preferably of saturated aliphatic monocarboxylic acids with at least 5 carbon atoms which are in alpha position branched to the carboxyl group, like pivalic acid. Because of their ready availability and because the copolymerizates produced from them by our process give particularly good results, particularly preferred as compounds (2) are vinyl esters of mixtures of saturated aliphatic monocarboxylic acids branched in the alpha position in the carboxyl group which have at least 8 carbon atoms, i.e. of so-called "Koch acids." As is known, mixtures of carboxylic acids of the above description can be produced, for instance, by the conversion of mono-olefines like propylene with carbon monoxide and water in the presence of acid catalysts like boron trifluoride, and are commercially available for instance under the name "Versatic 911" and "Versatic 1519." (The name "Versatic" is a registered trademark).

The compounds (3) of the general formula $CH_2=CHR$ can be styrol, vinyl ethers, namely vinyl methyl ether, vinyl ethyl ether, vinyl-n-propyl ether and vinyl isopropyl ether, or vinyl esters like vinyl formate, vinyl acetate and vinyl propionate. Preferred as compound (3) is vinyl acetate. For water-soluble salts of the copolymerizates of the compounds (1), (2) and (3) one uses preferably the alkaline metal salts, particularly the sodium and ammonia salts. Particularly useful is the use of ammonium salts.

The copolymerizates from the compounds (1), (2) and (3) can be manufactured in accordance with any method suitable for making addition-copolymerizates containing maleic acid units or maleic acid anhydride units. For instance, one can use the known method for the polymerization of mixtures of maleic acid anhydride and vinyl acetate, with the exception that one uses in addition to compounds (2), for instance vinyl esters of saturated aliphatic carboxylic acids which are branched in alpha position to the carboxyl group and which contain 9 to 11 carbon atoms. From the copolymerizates made by the copolymerization of the compounds (1), (2) and (3) one can make the protective colloids used in accordance with the invention, by the usual method for the neutralization of acids and transformation of acid anhydrides into water-soluble salts. Preferred is the production of copolymerizates from compounds (1), (2) and (3) by radical precipitation polymerization, using monomer soluble catalysts, for which examples are given above, in solvents that are inert to maleic acid anhydride, like aromatic hydrocarbons, e.g. benzene.

The finely powdered copolymerizates obtained in this manner can be easily converted into the corresponding alkali metal or ammonium salts, by adding the copolymerizates to aqueous solutions of alkali metal hydroxides like sodium hydroxide or ammonium hydroxide while stirring and heating slightly, e.g. to 30° and up to 60° C., or by dispersing the copolymerizates in water and the dispersion thus obtained is then compounded with the computed quantity of alkali metal hydroxide or ammonia.

The protective colloids according to the invention are used preferably in quantities of 0.1 to 0.3 weight percent, referred to the total weight of the monomers.

The total quantity of the mixture to be polymerized, consisting of vinyl chloride and other olefinically unsaturated compounds that can be copolymerized with it, can be available at the beginning of the polymerization; but one can also add the monomers into the polymerization vessel in part or entirely in a mixture or separately during polymerization.

The useful pH value of the initial polymerization is between 4 and 7. The polymerization temperature is within the customary range for the suspension polymerization of vinyl chloride, i.e. usually between 0° and 160° C., preferably between 30 and 80° C.

The polymerization is carried out with the amount of mixing usually necessary during the suspension polymerization of vinyl chloride for maintaining the dispersion of the monomers in the aqueous medium, and preferably in enameled autoclaves or those lined with refined steel, for polymerization vessels.

Here are some examples for lacquer solvents in which the copolymerizates of vinyl chloride made according to our invention yield clear solutions: as solvents for esters which are ordinarily used, like ethyl acetate, methyl acetate and butyl acetate, as solvents for ordinarily used ketones like acetone, methyl ethyl ketone, methyl propyl ketone and cyclohexanone; methylene chloride, ethylene chloride, diacetone alcohol, isophrone and glycol ether acetates. One can also use mixtures of solvents.

The solutions of the copolymerizates of vinyl chloride made according to the invention can be used in solvents for all purposes where one uses solutions of copolymerizates of vinyl chloride. To this belongs for instance the making of coatings on metals, like iron, aluminum and copper, on paper and the sealing of floors. The solutions of copolymerizates of vinyl chloride made according to the invention, in lacquer solvents, are particularly suitable for the manufacture of glass-clear sheets by the casting method and of fibers by the dry spinning method.

In the examples that follow, the parts and percentages refer to the weight in each case.

Example for manufacturing a protective colloid that is to be used in accordance with the invention A mixture of—

145.0 parts benzene
39.6 parts vinyl acetate
10.3 parts vinyl ester of a mixture, commercially available under the name "Versatic 911" (registered trademark) of saturated aliphatic monocarboxylic acids branched in alpha position to the carboxyl group and having 9 to 11 carbon atoms
50.1 parts maleic acid anhydride
0.08 parts isopropyl peroxydicarbonate is heated for 45 hours to 35° C. After the benzene is filtered off and after drying, the finely powdered polymerizate is suspended in water and converted into the water-soluble ammonium salt by compounding with ammonia in the quantity equivalent to the originally used quantity of maleic acid anhydride.

Example of the invention process

In a series of experiments, named experiments 1 to 6, polymerizations were carried out with the protective colloids shown in Tables I and Ia below, at quantities shown in Table I (weight percentages referred to the total weight of the monomers). The polymerization and the production of the polymerizates obtained thereby occurred as follows:

An autoclave mixer lined with refined steel with a capacity of 400 liters was first charged with 200 kg. of a solution of the protective colloid in water and then with 0.05 kg. dilauroyl peroxide. After the air was removed from the autoclave, 58 kg. vinyl chloride and 42 kg. vinyl acetate were filled into the autoclave. Then the contents were heated for 15 hours at 60° C., while mixing at 140 rotations per minute. The residue of unconverted monomers still left in the autoclave after the autoclave was depressurized to normal was removed by reducing the pressure in the autoclave to 0.6 atmospheres (abs.). Finally the polymerizate was filtered off, washed with water, and dried.

TABLE I

| Exper. No. | Protect. Colloid | Percent Prot. Coll. | Sieve residue in weight percent more than— | | | | | |
|---|---|---|---|---|---|---|---|---|
| | | | 1.0 mm. | 0.5 mm. | 0.3 mm. | 0.2 mm. | 0.1 mm. | <0.1 mm. |
| 1 | a | 0.2 | 0 | 0 | 1 | 5 | 68 | 26 |
| 2 | b | 0.2 | 0 | 1 | 3 | 9 | 55 | 32 |
| 3 | c | 0.2 | 0 | 0 | 8 | 7 | 39 | 46 |
| 4 | d | 0.2 | 1 | 5 | 12 | 22 | 35 | 25 |
| 5 | e | 0.1 | 2 | 4 | 7 | 21 | 47 | 19 |
| 6 | f | 0.2 | 0 | 2 | 15 | 33 | 42 | 8 |

TABLE Ia

[Composition of the protective colloids a to f]

| Prot. Coll. | | At the mol proportion |
|---|---|---|
| a | Ammonium salt of the copolymerizate from maleic acid resp. maleic acid anhydride, vinyl acetate and vinyl ester VE* units. | 10=9=1 |
| b | do | 8=9=1 |
| c | do | 4=3=1 |
| d | do | 3=4=1 |
| e | Vinyl laurate units | 5=4=1 |
| f | Vinyl pivalate units | 2=1=1 |

*"Vinyl ester VE" is the abbreviation for vinyl ester of a mixture of saturated aliphatic carboxylic acids, branched in alpha position to the carboxyl group, with 9 to 11 carbon atoms, which is commercially available under the name "Versatic 911" (the name "Versatic" is a registered trademark).

In each case, 20 g. of the copolymerizates of vinyl chloride and vinyl acetate made in experiments 1 to 6 were dissolved in 80 g. of ethyl acetate. The results were clear solutions free of lumps, i.e. of incompletely dissolved and badly swelled particulars.

Comparative tests

In a series of comparative tests, which are designated comparative tests 1 to 3, polymerizations were carried out with the protective colloids shown in Tables II and IIa below, which are outside the invention, in the quantities (weight percent referred to the total weight of the monomers) shown in Table II. The polymerization and the production of the polymerizates was done in each case as shown in the example given above for the process of the invention, with the exception that protective colloids other than those shown in Table Ia were used.

TABLE II

| Compar. Test No. | Prot. Coll. | Percent Prot. Coll. | Sieve residue in weight percent more than— | | | | | |
|---|---|---|---|---|---|---|---|---|
| | | | 1.0 mm. | 0.5 mm. | 0.3 mm. | 0.2 mm. | 0.1 mm. | <0.1 mm. |
| 1 | Va | 0.3 | 92 | 6 | 2 | 0 | 0 | 0 |
| 2 | Va | 0.5 | 16 | 67 | 13 | 3 | 1 | 0 |
| 3 | Vb | 0.2 | 99 | 1 | 0 | 0 | 0 | 0 |

Table IIa.—Composition of the protective colloids Va and Vb

Va Ammonium salt of the copolymerizate of maleic acid resp. maleic acid anhydride and vinyl acetate units with the mol proportion 1:1

Vb Sodium salt of the copolymerizate of maleic acid resp. maleic acid anhydride and styrol units with the mol proportion 1:1:

As shown by comparing Table I with Table II, our process yields polymerizates with particles that are considerably finer than those of the polymerizates obtained by the comparative tests.

In each case, 20 g. of the copolymerizates of vinyl chloride and vinyl acetate made in the comparative tests 1 to 3 were dissolved in 80 g. of ethyl acetate. The solutions thus obtained are somewhat cloudy and contain flaky and lumpy particles.

The invention claimed is:

1. Process for making copolymerizates which yield clear solutions with lacquer solvents, by the suspension polymerization of mixtures of vinyl chloride and other olefinically unsaturated compounds which can be copolymerized with vinyl chloride in aqueous dispersion in the presence of copolymerizates of maleic acid anhydride, in which the copolymerization takes place in an aqueous dispersion containing as a protective colloid a water-soluble salt of (1) 30 to 60 mol percent maleic acid or maleic acid anhydride units, (2) 1 to 25 mol percent polymer units which are derived from compounds of the general formula $$CH_2=CH-X-C_nH_{2n+1}$$

where X is an ether oxygen atom or a residue of the formula

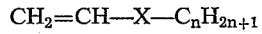

and $n$ is a positive whole number with a value of at least 4 and not over 28 and (3) 100–A mol percent, where A is the sum of mol percent of the units (1) and (2) contained in the ternary copolymerizates, polymer units which are derived from compounds of the general formula $CH_2=CHR$, where R is the phenyl residue or a resdiue of the general formula $-OC_mH_{2m+1}$ or

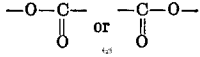

$m$ being 1, 2 or 3, respectively, where not more mol percent of units (2) are present than mol percent of units (3).

2. Process as claimed in claim 1, in which the polymer units (3) are vinyl acetate units.

3. Process as claimed in claim 2, in which the polymer units (2) are derived from vinyl esters of aliphatic carboxylic acids with at least 5 carbon atoms.

4. Process as claimed in claim 2, in which the polymer units (2) are derived from vinyl esters of saturated aliphatic carboxylic acids branched in alpha position to the carboxylic group.

References Cited

UNITED STATES PATENTS

| | | | |
|---|---|---|---|
| 2,689,836 | 9/1954 | Bier | 260—85.5 XR |
| 3,390,142 | 6/1968 | Benetta et al. | 260—92.8 |

JAMES A. SEIDLECK, Primary Examiner

JOHN KIGHT III, Assistant Examiner

U.S. Cl. X.R.

260—31.2, 31.4, 32.8, 33.8, 85.5, 86.3, 87.5, 92.8